United States Patent
Lorenz et al.

(10) Patent No.: US 8,349,983 B2
(45) Date of Patent: Jan. 8, 2013

(54) AQUEOUS SOLUTION CONTAINING COPOLYMERS WITH POLYETHER SIDE CHAINS

(75) Inventors: Klaus Lorenz, Zangberg (DE); Gerhard Albrecht, Prien am Chiemsee (DE); Silke Flakus, Ebersberg (DE); Alexander Kraus, Evenhausen (DE); Helmut Mack, Traunstein (DE); Petra Wagner, Trostberg (DE); Barbara Wimmer, Tacherting (DE); Christian Scholz, Wald an der Alz (DE); Angelika Hartl, Emertsham (DE); Martin Winklbauer, Halsbach (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 12/867,016

(22) PCT Filed: Jan. 12, 2009

(86) PCT No.: PCT/EP2009/050263
§ 371 (c)(1),
(2), (4) Date: Oct. 22, 2010

(87) PCT Pub. No.: WO2009/100958
PCT Pub. Date: Aug. 20, 2009

(65) Prior Publication Data
US 2011/0034592 A1    Feb. 10, 2011

(30) Foreign Application Priority Data

Feb. 13, 2008   (EP) .................................... 08101596

(51) Int. Cl.
C08F 220/06   (2006.01)
C08F 290/06   (2006.01)

(52) U.S. Cl. .................. 526/334; 526/317.1; 526/318.5; 526/332; 526/333

(58) Field of Classification Search .................. 526/334, 526/317.1, 318.5, 332, 333
See application file for complete search history.

(56) References Cited

U.S. PATENT DOCUMENTS

| 6,998,453 B2 * | 2/2006 | Yoneda et al. ................. 526/234 |
| 2003/0158077 A1 * | 8/2003 | Yamamoto et al. ........... 510/475 |

FOREIGN PATENT DOCUMENTS

| EP | 1 103 570 A2 | 5/2001 |
| EP | 1103570 A2 * | 5/2001 |
| EP | 1 300 426 A1 | 10/2006 |
| EP | 1707542 A2 * | 10/2006 |
| WO | WO 2005/075529 A2 | 8/2005 |

* cited by examiner

*Primary Examiner* — Kelechi Egwim
(74) *Attorney, Agent, or Firm* — Curatolo Sidoti Co, LPA; Joseph G. Curatolo; Vincent A. Cortese

(57) ABSTRACT

The invention relates to a process for the preparation of an aqueous solution comprising 30 to 95% by weight of water and 5 to 70% by weight of a copolymer dissolved in the water by free radical solution polymerizations of an isoprenol polyether derivative with an acrylic acid derivative, so that the copolymer has 20 to 45 mol % of an isoprenol polyether derivative structural unit and 55 to 80 mol % of an acrylic acid derivative structural unit. The aqueous solution is suitable as a superplasticizer for hydraulic binders.

16 Claims, No Drawings

AQUEOUS SOLUTION CONTAINING COPOLYMERS WITH POLYETHER SIDE CHAINS

CROSS REFERENCE TO RELATED APPLICATIONS

This application is a national stage application of International Application No. PCT/EP2009/050263, filed 12 Jan. 2009, which claims priority from European Patent Application Serial No. 08 101 596,8, filed 13 Feb. 2008, from which applications priority is claimed, and which are incorporated herein by reference.

The present invention relates to a process for the preparation of an aqueous solution and the aqueous solution.

It is known that admixtures in the form of dispersants are often added to aqueous slurries of pulverulent inorganic or organic substances, such as clays, silicate powder, chalk, carbon black, crushed rock and hydraulic binders, for improving their processability, i.e. kneadability, spreadability, sprayability, pumpability or flowability. Such admixtures are capable of preventing the formation of solid agglomerates, dispersing already present particles and particles newly formed by hydration and in this way improving the processability. This effect is also utilized in a targeted manner in particular in the production of building material mixtures which contain hydraulic binders, such as cement, lime, gypsum, hemihydrate or anhydrite.

In order to convert these building material mixtures based on said binders into a ready-to-use, processable form, as a rule substantially more mixing water is required than would be necessary for the subsequent hydration or hardening process. The proportion of cavities which are formed by the excess, subsequently evaporating water in the concrete body leads to significantly poorer mechanical strengths and stabilities.

In order to reduce this excess proportion of water at a specified processing consistency and/or to improve the processability at a specified water/binder ratio, admixtures that are generally referred to as water-reducing agents or superplasticizers are used. Agents of this type which are used in practice are in particular copolymers which are prepared by free radical copolymerization of acid monomers and/or acid derivative monomers with polyether macromonomers. The copolymerization is expediently carried out as aqueous solution polymerization and the aqueous solution comprising the copolymer is used as water-reducing agent or superplasticizer.

WO 2005/075529 describes copolymers which, in addition to acid monomer structural units, have vinyloxybutylenepoly(ethylene glycol) structural units as polyether macromonomer structural units. Aqueous solutions which have such copolymer types are widely used as high-performance superplasticizers since they have excellent performance characteristics. In this context, the robustness or universality with regard to the use of different cements, different mixing procedures and different temperatures of use should be particularly singled out. The concrete containing these high-performance superplasticizers is usually distinguished by particularly good processability.

The vinyloxybutylenepoly(ethylene glycol) used as a monomeric precursor of these copolymers is obtained by ethoxylation of 4-hydroxybutyl vinyl ether. 4-Hydroxybutyl vinyl ether is an industrial secondary product of acetylene. Owing to the fact that the chemistry based on acetylene (Reppe chemistry) has been very substantially replaced by the chemistry based on ethylene, the industrial production of 4-hydroxybutyl vinyl ether is associated with the few industrial locations still operating Reppe chemistry. It can also usually be assumed that 4-hydroxybutyl vinyl ether cannot or will not be able to be particularly economically prepared as a product of the Reppe chemistry, which is complicated particularly in point of view of safety. The abovementioned accordingly also affects the availability and the costs of vinyloxybutylenepoly(ethylene glycol) and the corresponding copolymers or aqueous copolymer solutions.

The object of the present invention is therefore to provide a process for the preparation of an economical dispersant for hydraulic binders which is particularly suitable as a superplasticizer/water-reducing agent for concrete.

This object is achieved by a process for the preparation of an aqueous solution comprising 30 to 95% by weight of water and 5 to 70% by weight of a copolymer dissolved in the water by free radical solution polymerizations of an isoprenol polyether derivative with an acrylic acid derivative, so that the copolymer has
i) 20 to 45 mol % of an isoprenol polyether derivative structural unit α) and
ii) 55 to 80 mol % of an acrylic acid derivative structural unit (β),
the isoprenol polyether derivative structural unit α being represented by the following general formula (Ia)

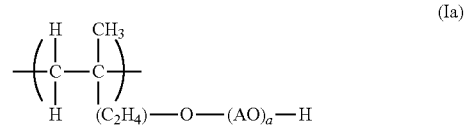

where
A is identical or different and is represented by an alkylene group according to $C_xH_{2x}$ where x=2, 3, 4 or 5,
a is identical or different and is represented by an integer between 11 and 34,
the acrylic acid derivative structural unit β being represented by the following general formulae (IIa) and/or (IIb)

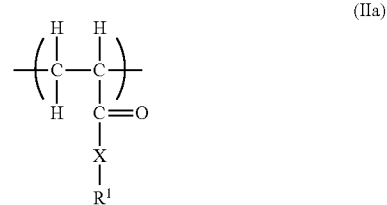

where
X is identical or different and is represented by NH—$(C_nH_{2n})$ where n=1, 2, 3 or 4 or represented by O—$(C_nH_{2n})$ where n=1, 2, 3 or 4:
$R^1$ is identical or different and is represented by $SO_3H$, $PO_3H_2$, $OPO_3H_2$ and/or $C_6H_4$—$SO_3H$

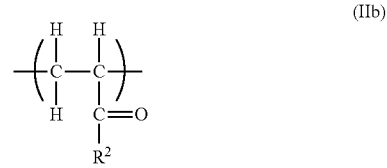

$R^2$ is identical or different and is represented by OH, OM where M=Na, K, Ca and/or $ONH_4$.

The determination of a (number of alkoxy groups) in the isoprenol polyether derivative structural unit a according to the general formula (Ia) is effected on the basis of so-called MALDI-TOF-MS measurements (MALDI-TOF-MS is an abbreviation for Matrix Assisted Laser Desorption/Ionization Time Of Flight Mass Spectroscopy). The MALDI-TOF-MS measurements carried out in this context were carried out on a "Bruker Reflex III", equipped with a 337 nm nitrogen laser. The acceleration voltage was 20 kV and the detection of the cation spectra was effected in the reflector mode.

Dihydroxybenzoic acid (DHB) was used as a matrix and potassium chloride from Merck KGaA as the salt. The sample was prepared as a solid. For this purpose, in each case a pinch of the corresponding sample was dissolved in THF. A small part of the dissolved sample was then triturated with a pinch of DHB and a pinch of potassium chloride in a mortar. A part of this mixture was applied to a sample target by means of a spatula. The calibration was effected with an external standard which was composed of the following peptides (Pepmix): 10 pm/µl of Bradikinin, 10 pm/µl of Angiotensin I, 10 pm/µl of Angiotensin II, 10 pm/µl of Neurotensin and 10 pm/µl of ACTH. The peptides were dissolved in a mixture of 20% by weight of acetonitrile, 79.9% by weight of $H_2O_2$ and 0.1% by weight of formic acid. The Pepmix is additionally diluted with $H_2O$. For the calibration, 1 µl of Pepmix was mixed with 1 µl of DHB solution on a spot of the target. A methanol-water mixture in the ratio 1:1 was used as the solvent for the DHB solution. The concentration was 10 mg/ml.

The isoprenol polyether derivative structural unit α is decisively involved in the dispersing effect of the dissolved copolymer. The precursor of the corresponding monomeric starting compound is isoprenol (3-methyl-3-buten-1-ol). Isoprenol is a product of olefinic chemistry, which is obtained, for example, in large amounts as an intermediate in the citral synthesis: In general, it may be said that isoprenol may be regarded as an economical intermediate of the chemical industry which is available in large amounts. This means that the copolymer solution according to the invention, for which isoprenol is a particularly important starting material, is correspondingly highly attractive economically. Also important is that the copolymers according to the invention have the excellent performance characteristics of the high-performance superplasticizers which are described above.

Finally, regarding the preparation of the aqueous copolymer solution (polymerization process), it should be mentioned that alkoxylated isoprenol is easier to handle in terms of process engineering, owing to the particularly high resistance to acidic hydrolysis compared with vinyloxybutylene-poly(ethylene glycol).

The aqueous solution preferably contains 45 to 65% by weight of water and 35 to 55% by weight of the copolymer dissolved in water. This takes optimum account as a whole of the stability of the solution and the cost-efficiency (minimization of storage costs and transport costs).

In general, the copolymer comprises 25 to 45 mol % of the isoprenol polyether derivative structural unit α).

As a rule, the copolymer comprises 60 to 75 mol % of the acrylic acid derivative structural unit β).

Usually, the following is true in the general formula (Ia) representing the isoprenol polyether derivative structural unit α: a=16 to 28.

Usually, in the general formula (Ia) representing the isoprenol polyether derivative structural unit α), x is represented by 2 and/or 3, preferably 2.

In a preferred embodiment of the invention, acrylic acid as such is used as the acrylic acid derivative.

Often, the copolymer has a weight average molecular weight of 10 000 to 100 000.

In addition to the isoprenol polyether derivative structural unit α) and the acrylic acid derivative structural unit β), the dissolved copolymer may also have at least one further structural unit. Then, hydroxybutyl vinyl ether is used as copolymer, for example, so that the dissolved copolymer has at least 1 mol % of a hydroxybutyl vinyl ether structural unit µ, which is represented by the general formula (IIIa)

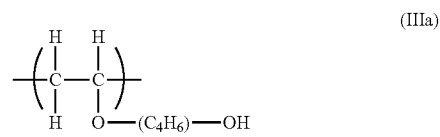

The free radical solution polymerization is typically carried out in a temperature range from 0 to 40° C. in the presence of a redox initiator.

Upon its use, the aqueous solution is normally mixed with a hydraulic binder and/or a latently hydraulic binder.

In general, the hydraulic binder is present as cement, lime, gypsum, hemihydrate or anhydrite or as mixtures of these components, but preferably as cement. The latently hydraulic binder is usually present as fly ash, trass or a blast furnace slag.

The present invention finally also relates to an aqueous solution which can be prepared according to the process described above.

The present invention is to be described in more detail below with reference to working examples.

Copolymer solutions according to the invention (according to Preparation Examples 1 and 2) are to be compared with copolymer solutions which are already successfully used in practice (according to Comparative Examples 1 and 2) with regard to the performance thereof.

PREPARATION EXAMPLE 1 (EX. 1)

Solution According to the Invention with Copolymer Type 1

A glass reactor equipped with a plurality of feed possibilities, stirrer and dropping funnel was loaded with 143 ml of water and 165 g of macromonomer (prepared by ethoxylation of 3-methyl-3-buten-1-ol with 22 mol of EO) (solution A) and thermostatted at 15.4° C. A portion of the second prepared, partly neutralized solution (solution B), consisting of 61.05 g of water and 23.5 g of acrylic acid (90%), was added to solution A over a period of 15 min in the glass reactor. Furthermore, 1.11 g of 3-mercaptopropionic acid were added to the reactor. A 3rd solution (solution C), consisting of 3 g of sodium hydroxymethanesulphinate dihydrate and 47 g of water, was prepared. Thereafter, 46.5 mg of iron(II) sulphate heptahydrate, dissolved in a few drops of water, and 2.87 g of 30% strength hydrogen peroxide solution were added to solution A at a temperature of 15.4° C. Furthermore, the still remaining solution B was metered into solution A over 45 minutes and solution C was metered into solution A over 50 minutes. Finally ~25 ml of 20% strength sodium hydroxide solution were added and a pH of 6.5 was established.

The aqueous solution of a copolymer having an average molecular weight of Mw=35 400 g/mol, a polydispersity of 1.59 and a solids content of 42.1% was obtained. The yield of polymer in comparison with unsaturated alcohol ethoxylate not incorporated in the following polymerized units was 92% (determined by gel permeation chromatography, referred to below as GPC).

PREPARATION EXAMPLE 2 (EX. 2)

Solution According to the Invention with Copolymer Type 2

A glass reactor equipped with a plurality of feed possibilities, stirrer and dropping funnel was loaded with 110 ml of water and 165 g of macromonomer (prepared by ethoxylation of 3-methyl-3-buten-1-ol with 22 mol of EO) (solution A) and thermostatted at 14° C. A portion of a second prepared, partly neutralized solution (solution B), consisting of 79 g of water and 30.4 g of acrylic acid (90%), was added to solution A over a period of 15 min in the glass reactor. Furthermore, 1.31 g of 3-mercaptopropionic acid were added to the reactor. A 3rd solution (solution C), consisting of 3 g of sodium hydroxymethanesulphinate dihydrate and 47 g of water, was prepared. Thereafter, 46.5 mg of iron(II) sulphate heptahydrate, dissolved in a few drops of water, and 2.87 g of 30% strength hydrogen peroxide solution were added to solution A at a temperature of 14° C. Furthermore, the still remaining solution B was metered into solution A over 45 minutes and solution C was metered into solution A over 75 minutes. Finally ~31 ml of 20% strength sodium hydroxide solution were added and a pH of 6.5 was established.

An aqueous solution of a copolymer having an average molecular weight of Mw=32 000 g/mol, a polydispersity of 1.65 and a solids content of 42.7% was obtained. The yield of polymer in comparison with unsaturated alcohol ethoxylate not incorporated in the following polymerized units was 93% (determined by GPC).

COMPARATIVE EXAMPLE 1 (COMP. 1)

Corresponding to the Solution with Copolymer Type 1

Commercial concrete superplasticizer Glenium® 115 (from BASF Construction Polymers GmbH) based on a copolymer of vinyloxybutylenepoly(ethylene glycol), an ethylenically unsaturated carboxylic acid and an ethylenically unsaturated dicarboxylic acid derivative—the polymer according to Comparative Example 1 has a closely related polymer architecture in comparison with copolymer type 1.

COMPARATIVE EXAMPLE 2 (COMP. 2)

Corresponding to the Solution with Copolymer Type 2

Commercial concrete superplasticizer Melflux® 2320 (from BASF Construction Polymers GmbH) based on a copolymer of vinyloxybutylenepoly(ethylene glycol), an ethylenically unsaturated carboxylic acid and an ethylenically unsaturated dicarboxylic acid derivative—the polymer according to Comparative Example 2 has a closely related polymer architecture in comparison with copolymer type 2.

First the polymerization behaviour in relation to the achieved molecular weight distribution and conversion is to be considered. Table 1 shows that the preparation of the dissolved polymers which relate to the invention takes place with in each case somewhat higher conversions than those of the comparative dissolved polymers. A further important criterion for good performance in the concrete is the average molar mass of the dissolved polymers.

TABLE 1

Molar masses and conversions of the copolymers

| Polymer | $M_w$ [g/mol] | Pd | Conversion (%) |
|---|---|---|---|
| Ex. 1 | 35 400 | 1.59 | 92 |
| Comp. 1 | 33 200 | 1.56 | 87 |
| Ex. 2 | 32 000 | 1.65 | 93 |
| Comp. 2 | 28 500 | 1.49 | 87 |

Table 1 shows in each case the values for $M_w$ and for the polydispersity (Pd). Both products according to the invention have an average molar mass in the range of the comparative polymers. The polydispersities are likewise in a comparative range.

For further evaluation of the copolymer solutions, concrete tests were carried out. The experimental procedures are described in Use Examples 1 and 2. In the tests, it was intended to check whether the copolymer solutions according to the invention showed a good performance, i.e. the same plasticization and the same slump over time, under the same test conditions (w/c value, temperature, aggregates, etc.) and in the same dose.

Carrying Out the Concrete Tests:

280 kg of Portland cement (CEM I 42.5 R, Mergelstetten) were stirred with round aggregates having a composition, according to the Fuller screening curve, at a maximum particle size of 16 mm, 80 kg of limestone powder filler Calcit MS 12 and 156.8 kg of water, which contained the products according to the invention or the comparative products in dissolved form. Immediately after the preparation of the concrete mix, the determination of the slump and the change thereof as a function of time over a period of 60 minutes was effected.

The results of the test are shown in the tables below.

280 kg of Portland cement (CEM I 42.5 R, Karlstadt) were stirred with round aggregates having a composition, according to the Fuller screening curve, at a maximum particle size of 16 mm, 80 kg of limestone powder filler Calcit MS 12 and 162.4 kg of water, which contained the products according to the invention or the comparative products in dissolved form. Immediately after the preparation of the concrete mix, the determination of the slump and the change thereof as a function of time over a period of 60 minutes was effected.

The results are shown in the tables below.

TABLE 2

| Admixture | Solid [% by weight] | Dose [% by weight] | Slump in cm after | | | |
|---|---|---|---|---|---|---|
| | | | 0 min. | 10 min. | 30 min. | 60 min. |
| Ex. 1 | 30 | 0.14 | 63.5 | 57.5 | 51.5 | 48.5 |
| Comp. 1 | 30 | 0.14 | 63 | 57.5 | 51.5 | 47.5 |
| Ex. 2 | 30 | 0.13 | 62.5 | 57.5 | 51 | 47 |
| Comp. 2 | 30 | 0.13 | 62.5 | 59 | 53.5 | 47.5 | w/c = 0.56, cement: Mergelstetten

Table 2 shows the results of the concrete tests using Mergelstetten cement. For both example polymers, virtually identical plasticization can be observed at the same dose. In addition, the development of the slump over 60 minutes is comparable to the reference polymers. The test using Karlstadt cement also shows virtually identical behaviour of the example polymers with their references (Table 3).

TABLE 3

| Admixture | Solid [% by weight] | Dose [% by weight] | Slump in cm after | | | |
|---|---|---|---|---|---|---|
| | | | 0 min. | 10 min. | 30 min. | 60 min. |
| Ex. 1 | 30 | 0.14 | 59.5 | 59.5 | 54.5 | 50.5 |
| Comp. 1 | 30 | 0.14 | 59 | 60 | 57.5 | 51.5 |
| Ex. 2 | 30 | 0.13 | 65.5 | 61.5 | 54.5 | 51.5 |
| Comp. 2 | 30 | 0.13 | 65 | 64 | 53.5 | 50.5 | w/c = 0.57 for Example 1 and 0.58 for Example 2, cement: Karlstadt

The results show that the copolymer solutions according to the invention have properties comparable to the known high-performance superplasticizers with regard to their behaviour in concrete. In addition, the robustness/universality of the copolymers which relate to the invention is also confirmed by the use of different cements.

TABLE 4

| Admixture | Solid [% by weight] | Dose [% by weight] | Slump-flow in cm after | | | |
|---|---|---|---|---|---|---|
| | | | 0 min. | 10 min. | 30 min. | 60 min. |
| Ex. 1 | 30 | 0.14 | 39 | 32 | 25.5 | 22.5 |
| Comp. 1 | 30 | 0.14 | 37.5 | 33.5 | 27.5 | 24 | w/c = 0.56; cement: Mergelstetten

Table 4 shows the results for the slump-flow on the basis of Example 1 and the corresponding comparative polymer. With use of the same dose, comparable behaviour is observable here, too. This is further confirmation that the addition of the copolymers which relate to the invention results in a concrete which has a comparable consistency and just as good processability as is the case with the use of the high-performance superplasticizers successfully employed as a reference.

Overall conclusion from the results of the comparative experiments:

The above experiments show that the quality of the superplasticizers based on the copolymers which relate to the invention is outstanding. The performance is comparable with the vinyloxybutylenepoly(ethylene glycol)-based high-performance polymers which have already proved their worth in practice.

The invention claimed is:

1. Process for the preparation of an aqueous solution comprising 30 to 95% by weight of water and 5 to 70% by weight of a copolymer dissolved in the water by free radical solution polymerizations of an isoprenol polyether derivative with an acrylic acid derivative, so that the copolymer has i) 20 to 45 mol % of an isoprenol polyether derivative structural unit α) and
   ii) 55 to 80 mol % of an acrylic acid derivative structural unit β), the isoprenol polyether derivative structural unit a being represented by the following general formula (Ia)

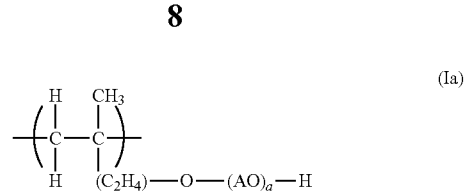

where
A is identical or different and is represented by an alkylene group according to $C_xH_{2x}$ where x=2, 3, 4 or 5,
a is identical or different and is represented by an integer between 11 and 34,
the acrylic acid derivative structural unit β being represented by the following general formula (IIa), and optionally additionally represented by the following general formula (IIb)

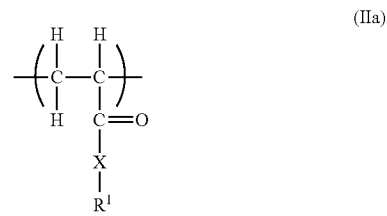

where
X is identical or different and is represented by NH—$(C_nH_{2n})$ where n=1, 2, 3 or 4 or represented by O—$(C_nH_{2n})$ where n=1, 2, 3 or 4;
$R^1$ is identical or different and is represented by $SO_3H$, $PO_3H_2$, $OPO_3H_2$ and/or $C_6H_4$—$SO_3H$

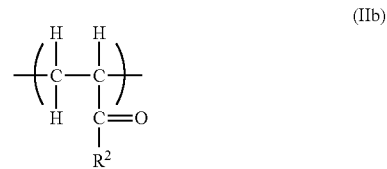

$R^2$ is identical or different and is represented by OH, OM where M=Na, K, or Ca, and/or $ONH_4$.

2. The Process according to claim 1, wherein the aqueous solution contains 45 to 65% by weight of water and 35 to 55% by weight of the copolymer dissolved in the water.

3. The Process according to claim 1, wherein the copolymer has 25 to 40 mol % of the isoprenol polyether derivative structural unit α).

4. The Process according to claim 1, wherein the copolymer has 60 to 75 mol % of the acrylic acid derivative structural unit β).

5. The Process according to claim 1, wherein a=16 to 28.

6. The Process according to claim 1, wherein in the general formula (Ia) representing the isoprenol polyether derivative structural unit α), x is represented by 2 and/or 3.

7. The Process according to claim 1, wherein the copolymer has a weight-average molecular weight of 10 000 to 100 000.

8. The Process according to claim 1, wherein in addition to the isoprenol polyether derivative structural unit α) and the acrylic acid derivative structural unit β), the dissolved copolymer also has at least one further structural unit.

9. The Process according to claim 1, wherein the free radical solution polymerization is carried out in a temperature range from 0 to 40° C. in the presence of a redox initiator.

10. The Process according to claim 1, wherein the aqueous solution is mixed with a hydraulic binder and/or a latently hydraulic binder.

11. The Process according to claim 10, wherein the hydraulic binder is present as cement, lime, gypsum.

12. The Process according to claim 10, wherein the latently hydraulic binder is present as fly ash, trass or blast furnace slag.

13. Aqueous solution prepared according to the process according to claim 1.

14. The Process according to claim 1, wherein in the general formula (Ia) representing the isoprenol polyether derivative structural unit α), x is represented by 2.

15. The Process according to claim 10, wherein the hydraulic binder is present as cement.

16. The Process according to claim 8, wherein a hydroxybutyl vinyl ether is used as a comonomer, so that the dissolved copolymer has at least 1 mol % of the hydroxybutyl vinyl ether structural unit μ which is represented by the general formula (IIIa)

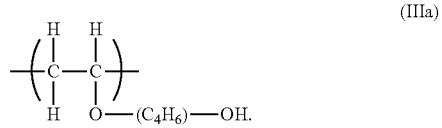

(IIIa)

* * * * *